(12) United States Patent
Rocamora et al.

(10) Patent No.: US 10,120,893 B1
(45) Date of Patent: Nov. 6, 2018

(54) STORING DATA TO CONTENT-ADDRESSABLE STORAGE

(71) Applicant: Amazon Technologies, Inc., Seattle, WA (US)

(72) Inventors: David Ricardo Rocamora, Seattle, WA (US); Michael Joseph Ruiz, Bainbridge Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 411 days.

(21) Appl. No.: 14/857,641

(22) Filed: Sep. 17, 2015

(51) Int. Cl.
*G06F 17/30* (2006.01)
*G06Q 10/10* (2012.01)

(52) U.S. Cl.
CPC .... *G06F 17/30371* (2013.01); *G06F 17/3012* (2013.01); *G06F 17/30097* (2013.01); *G06F 17/30876* (2013.01); *G06Q 10/10* (2013.01)

(58) Field of Classification Search
CPC combination set(s) only.
See application file for complete search history.

(56) References Cited

U.S. PATENT DOCUMENTS

| | | | |
|---|---|---|---|
| 2010/0064166 A1* | 3/2010 | Dubnicki | G06F 11/14 714/4.1 |
| 2014/0115182 A1* | 4/2014 | Sabaa | H04L 67/1097 709/232 |
| 2014/0189270 A1* | 7/2014 | Iwanicki | G06F 17/30159 711/162 |

* cited by examiner

*Primary Examiner* — Shyue Jiunn Hwa
(74) *Attorney, Agent, or Firm* — Thorpe North & Western, LLP.

(57) ABSTRACT

A technology is described for preparing and storing data to a content-addressable storage. An example method may include identifying defining characteristics for data that is to be stored in a content-addressable storage (CAS). A storage preparation model that may be associated with the defining characteristics of the data may be identified, wherein the storage preparation model may include specifications for dividing the data into data blocks and storing the data in the CAS. The data may then be divided into the data blocks based at least in part on the specifications of the storage preparation model, and metadata may be generated that specifies how to retrieve the data blocks from the CAS and provides an order used to reassemble the data using the data blocks retrieved from the CAS. The metadata may be included in the data blocks and the data blocks may be stored in the CAS.

20 Claims, 8 Drawing Sheets

Generate metadata describing how to reassemble the file 420

STORING DATA TO CONTENT-ADDRESSABLE STORAGE

BACKGROUND

Content-addressable storage (CAS) is a technology for storing data in a way that the data can be stored and retrieved based on the content of the data and not the storage location (e.g., storage address) of the data in a recording device or media. When a data object is stored in a CAS, the data object may be given a name that uniquely identifies the data object. For example, the content of a data object may be used to generate a hash value that uniquely identifies the data object, thereby creating a content address that may be used to identify and retrieve the data object from the CAS system. Generating a content address may eliminate a need for a centralized index used to track the location of a stored data object. As an example, a request to retrieve data from a CAS system may include a content address for a data object. Using the content address, the CAS system can determine a physical location of a data object and retrieve the data object from the CAS.

Storing data in a CAS may allow for deduplication of data objects in the CAS. For example, using the content of identical data objects to generate hash values results in identical hash values. Because the hash values are identical, a single data object may be stored to a CAS as opposed to storing multiple identical data objects, thereby reducing an amount of storage space needed to store the identical data objects.

DETAILED DESCRIPTION

Figure 1:
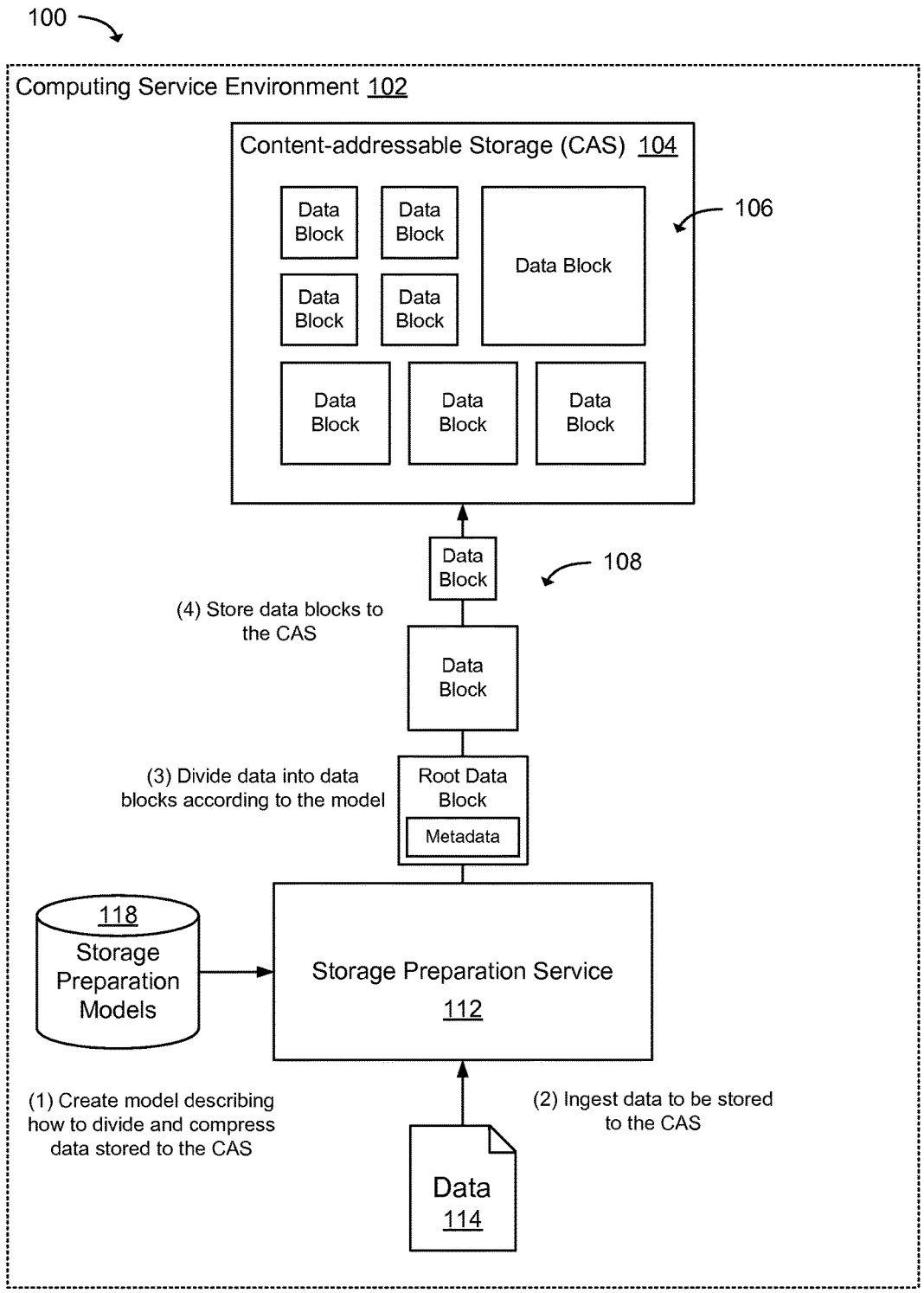
FIG. 1 is a block diagram illustrating an example system for preparing and storing data to a CAS using a storage preparation model.

A technology is described for preparing data for storage in a content-addressable storage (CAS) using a storage preparation model that includes processing specifications that may result in an increased opportunity for data block coalescing in the CAS. In one example, a storage preparation model may include specifications for dividing data (e.g., an electronic text file, binary file, image file, video file, etc.) into multiple data blocks based on data boundaries in the data (e.g., a delimiter, duplicated sections, block size, page break, tag, etc.). The storage preparation model may also include specifications for compressing one or more of the data blocks using a data compression technique.

In one example configuration, data may be received at a storage preparation service for ingestion into a CAS. The data may be analyzed to identify defining characteristics for the data. For example, the data may be analyzed to identify a file name, a file format, file content, file version, file owner, file subdivisions, or some other defining characteristic that uniquely identifies the data. The defining characteristics for the data may then be used to identify a storage preparation model that may be related to the defining characteristics. For example, the storage preparation model may include specifications for dividing and compressing data that has the defining characteristics.

The data may then be processed for storage to the CAS according to the specifications of the storage preparation model. More specifically, the storage preparation model may specify that the data is to be divided into data blocks based on one or more occurrences of a data boundary in the data indicating a point in the data where the data may be divided into multiple data blocks. Also, the storage preparation model may indicate that one or more data blocks may be compressed and may specify a compression technique that may be used to compress the data blocks.

In dividing the data into multiple data blocks and optionally compressing selected data blocks, metadata may be created describing how the data blocks will be stored to the CAS (e.g., the metadata may describe graph edges of a Directed Acyclic Graph (DAG) which link data blocks together for storage purposes) and specifies which data blocks were compressed and which data compression technique(s) was used to compress the data blocks. The metadata may be stored with the data blocks in the CAS and may be used to retrieve the data blocks from the CAS and reassemble the data from the data blocks.

In the past, data stored to a CAS may have been divided into data blocks using simple heuristics. For example, data may have been divided into fixed block sizes and stored to the CAS, resulting in fewer identical blocks and fewer incidents of block coalescing in the CAS. Namely, data blocks that may be substantially identical but for a small difference (e.g., a timestamp, file version number, file type headers, file codecs such as color or audio profiles, etc.) may both be stored to the CAS due to the content of the data blocks producing different hash values. As a result of the present technology, data that is to be stored to a CAS may be divided using specifications included in a storage preparation model that may be specific to the defining characteristics of the data. Consequently, the data may be divided into data blocks using customized instructions specific to a data file or data format, thereby increasing a likelihood that resulting data blocks may be identical to data blocks already stored in the CAS, leading to more incidents of block coalescing in the CAS.

FIG. 1 is a block diagram illustrating a high level example of a system 100 for preparing and then storing data 114 in a CAS 104. The system 100 may include a storage preparation service 112 and a CAS 104 that may be hosted within a computing service environment 102. The computing service environment 102 may employ virtualization that allows a single physical server computer to host multiple computing instances (e.g., virtual guest machines) using a hypervisor or another virtualization scheme. Each computing instance may be a guest machine acting as a distinct logical computing system. The storage preparation service 112 and the CAS 104 may be implemented using one or more computing instances included in the computing service environment 102. In one example, the CAS 104 may utilize an object storage service that executes within the computing service environment 102.

Storage preparation models 118 created for data 114 that is to be ingested into the CAS 104 may be stored within the system 100. A storage preparation model 118 may include specifications for dividing the data 114 into data blocks 108 and compressing specified data blocks 108 using a data compression technique prior to storing the data blocks 108 to the CAS 104. Storage preparation models 118 may be created for data 114 having certain defining characteristics. Defining characteristics may be characteristics that uniquely identify the data 114, such as a file format, file content, a file version, a file owner, file subdivisions, or other data characteristic.

As a specific example, a storage preparation model 118 may be created for data 114 having an image format (e.g., JPEG, GIF, or BMP) and may include specifications for dividing the image file into data blocks 108 (e.g., a start of image block, a payload block, an end of image block, color tables, etc.) and may specify whether to compress any of the data blocks 108. For example, the body of an image file may already be compressed and therefore, compression of a data block containing compressed data (e.g., JPEG compressed data) may not be necessary, while compression of a color table duplicated in each file may provide a significant amount of deduplication.

A storage preparation model 118 may be created for data 114 having a particular data type and defining characteristics and the defining characteristics for the data 114 may be assigned to the storage preparation model 118. The defining characteristics assigned to the storage preparation model 118 may be used to identify the storage preparation model 118 in the event that data 114 having the defining characteristics is received at the storage preparation service 112. In one example, a storage preparation model 118 may be assigned multiple defining characteristics for data 114 for which the storage preparation model 118 was created. As a specific example, the defining characteristics, file format, file version, and file owner may be linked to a storage preparation model 118, such that in the event that data 114 having the defining characteristics is received at the storage preparation service 112, the storage preparation model 118 may be identified using the defining characteristics of the data 114.

As a specific example, a storage preparation model 118 may be created for an image file, where the defining characteristic of the image file may be a file extension (e.g., TIF, JPG, PNG, or GIF) that identifies the image file as containing image data. In the event that an image file is to be stored to the CAS 104, the file extension of the image file may be analyzed and used to identify the storage preparation model 118.

Specifications used for preparing data 114 for storage in the CAS 104 that may be included in a storage preparation model 118 may be specific to the data 114. For example, certain data may include boundaries between data regions in the data 114, such as delimiters, duplicated sections, duplicate headers, page breaks, frame boundaries, tags, offsets, etc. that may be specific to the data 114. A boundary between data regions may be a point in the data 114 where the data 114 may be divided to form one or more data blocks 108. Some types of boundaries may be specific to certain files, such as text files (e.g., contracts or manuals) that have paragraphs of text that may be duplicated between documents, or HTML (Hypertext Markup Language) files that include frames that may be duplicated between files. Other types of boundaries may be common among different types of data 114, such as delimiters (e.g., commas, quotes, or brackets) or page breaks, and therefore may not be specific to any one data type.

In creating a storage preparation model 118 for a particular data format, the data 114 for which the storage preparation model 118 is being built may be analyzed to identify boundaries between data regions that may be used to divide the data 114 into multiple data blocks 108. For example, analysis of a file may result in identifying page breaks in the file that may provide points where the file may be divided. One or more boundaries between data regions identified in the data 114 may be specified in the storage preparation model 118. Thus, when processing data 114 prior to storing the data 114 in the CAS 104, the storage preparation model 118 may be referenced to obtain one or more boundaries used to locate points in the data 114 where the data 114 may be divided. Because boundaries between data regions may be used in dividing the data 114 and an amount of space between the boundaries is not fixed, resulting data blocks may be of any size.

Also, in creating the storage preparation model 118, data 114 may be analyzed to determine whether the data 114 may be compressed using a compression technique. For example, data 114 may be analyzed to determine whether the size of the data 114 is reduced when lossless compression is applied, or whether the size of the data 114 is not reduced when lossless compression is applied. Various compression techniques may be tried to identify a compression technique that when applied compresses the data to the smallest size as compared to other compression techniques. In one example, the data 114 may first be divided into data blocks 108 based on boundaries between data regions identified in the data 114 and various data compression techniques may then be tested using the data blocks 108. As a result, one compression technique may produce better compression results with some data blocks 108 (i.e., data type) as compared to other compression techniques. As an illustration, for data 114 that has been divided into two or more data blocks 108, a first compression technique may be applied to a first data block (e.g., a first data type), a second compression technique may be applied to a second data block (e.g., a second data type), and no compression may be applied to a third data block (e.g., the data may be uncompressible).

In one example, storage preparation models 118 may be created using machine learning to determine specifications for dividing data 114 and compressing the data, as is discussed later in association with FIG. 3. In another example, an administrator or a customer may create a storage preparation model 118 for data 114. For example, a customer that stores data 114 to the CAS 104 may construct a storage preparation model 118 for the customer's data 114. Because the customer may be familiar with the data 114, the customer may specify how the data 114 is to be divided, and specify whether to compress any resulting data blocks 108 and which compression technique(s) to apply. A storage preparation model 118 constructed by a customer may be associated with the customer's account, along with defining characteristics for the customer's data, such that when the customer's data is ingested to the CAS 104, the customer's storage preparation model may be identified using the customer's account and the defining characteristics, and the customer's storage preparation model may be used to process the customer's data prior to storing the customer's data to the CAS 104.

In some examples, a storage preparation model 118 that references other storage preparation models may be created. For example, storage preparation models 118 that include specifications for dividing and compressing data 114 having certain defining characteristics may be referenced in a single storage preparation model 118. As a specific example, a storage preparation model 118 may reference a first preparation model having specifications used to process text data and a second preparation model having specifications for processing image data.

Storage preparation models 118 may be stored so that the storage preparation models 118 may be accessible to the storage preparation service 112. In one example, the storage preparation service 112 may be configured to process data 114 prior to storing the data 114 to the CAS 104 using specifications included in a storage preparation model 118. In one example, data 114 may be received at the storage preparation service 112 where the data 114 may be analyzed to determine defining characteristics that are associated with the data 114.

Using the defining characteristics, a storage preparation model 118 for the data 114 may be identified. Specifications for dividing the data 114 into multiple data blocks 108 may then be obtained from the storage preparation model 118 and the data 114 may be divided according to the specifications. Because the data 114 may be divided based on boundaries between data regions, the data blocks 108 may be of various sizes.

Specifications for compressing the data blocks 108 may then be obtained from the storage preparation model 118. The specifications may identify a compression technique and a data type to which the compression technique may be applied. For instance, a storage preparation model 118 may specify that data blocks 108 of a certain data type be compressed using a compression technique. In some examples, a storage preparation model 118 may specify more than one compression technique and corresponding data types on which to apply the compression technique. For example, a first compression technique may be used to compress data blocks 108 of a first data type, and a second compression technique may be used to compress data blocks 108 of a second data type. In the case that a compression technique may not be specified for a particular data type, data blocks 108 having the particular data type may not be compressed prior to being stored to the CAS 104.

In dividing and compressing the data 114, metadata may be generated that describes how the data blocks 108 are stored in the CAS 104 and what, if any, compression techniques where used to compress the data 114. The metadata may be stored with the data blocks 108 in the CAS 104 and may be used to determine how to decompress and reassemble the data 114 using the data blocks 108 retrieved from the CAS 104. In one example, a root file block (e.g., of a storage structure) that includes the metadata may be created and stored with data blocks 108 in the CAS 104. The metadata in the root file block may reference the data blocks 108 stored in the CAS 104, thereby allowing for retrieval of the data blocks from the CAS 104 using the metadata.

In one example, a Directed Acyclic Graph (DAG) may be generated representing the data 114 stored in the CAS 104, where the DAG describes graph edges for the DAG. The DAG may be included in the metadata stored with the data blocks 108 in the CAS 104. Illustratively, a root file block may contain a list of hash values for data blocks 108 stored in the CAS 104 along with information about what order the data blocks 108 are reassembled and information for decompressing data blocks 108 that may have been compressed. The hash values may be used to retrieve the data blocks 108 from the CAS 104 and the data 114 may be reconstructed using the data block order information and compression information.

Data 114 that has been processed for storage to the CAS 104 (e.g., divided, compressed, and having metadata describing how to retrieve and reassemble the data 114) may then be stored to the CAS 104. The content of each data block 108 that is to be stored to the CAS 104 may be used to generate a hash value using a hash function. The hash value may be included in the metadata as described above. The data blocks 108 may then be stored to the CAS 104, resulting in coalescing the data blocks 106 in the CAS when a duplicate data block already exists in the CAS 104. The hash value for a root file block may be returned to a system requesting storage of the data 114 or to a customer, and the root file block may be stored by the system or customer and used to retrieve the data 114 from the CAS.

Figure 2:
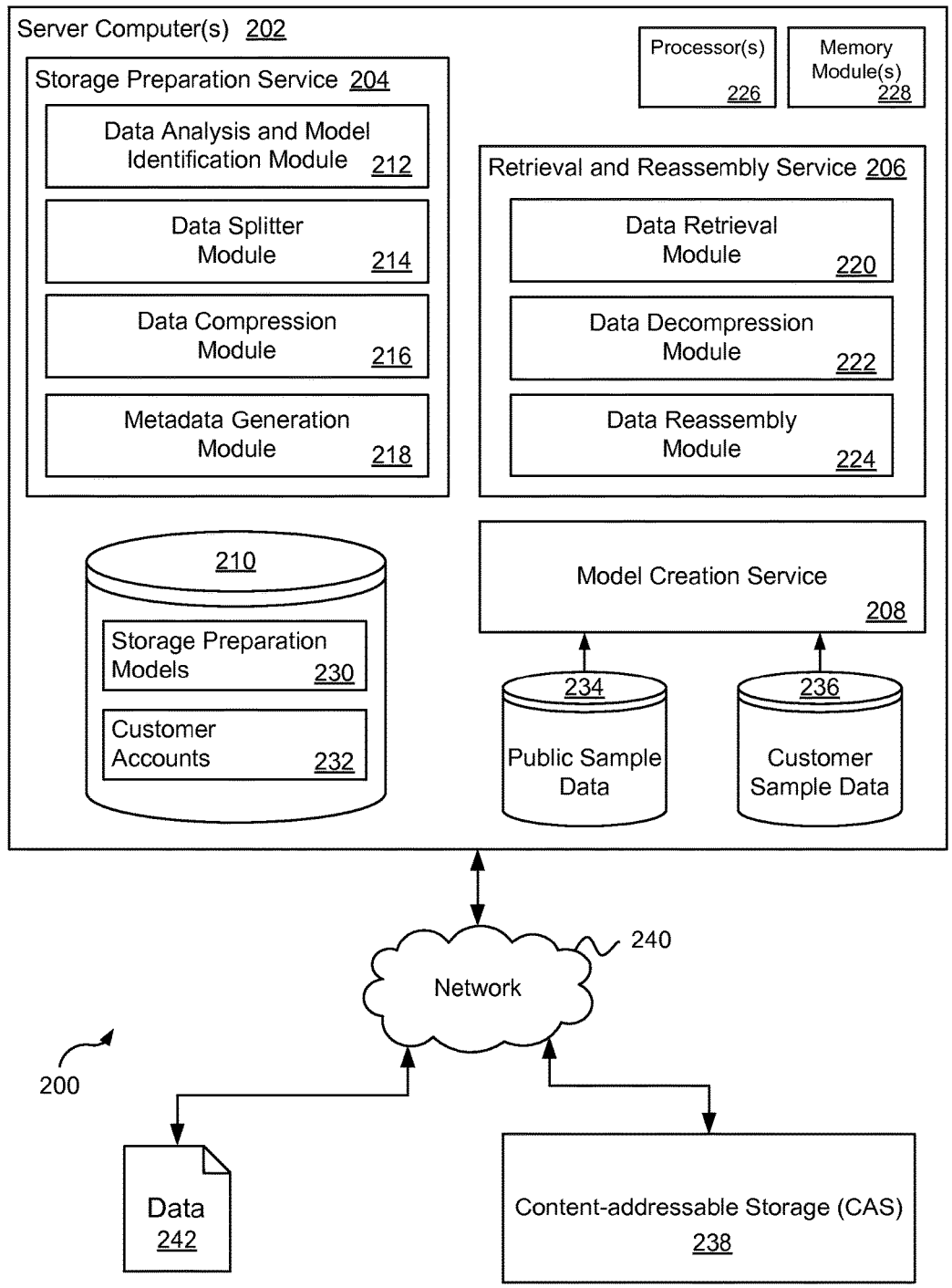
FIG. 2 is a block diagram that illustrates various example components included in a system for creating storage preparation models and processing data that is to be stored to a CAS using the storage preparation models.

FIG. 2 illustrates components of an example system 200 on which the present technology may be executed. The system 200 may include one or more server computers 202 that may be in communication with a CAS 238 via a network 240. A server computer 202 may contain one or more services used in storing and/or retrieving data 242 from the CAS 238. In one example, the services may include a model creation service 208, a storage preparation service 204, and a retrieval and reassembly service 206.

The model creation service 208 may be used to create storage preparation models 230. In one example, the model creation service 208 may be configured to simulate processing of data 242 for storage in the CAS 238 using data processing specifications for dividing and compressing the data 242 prior to storing the data 242 in the CAS 238. Data processing specifications used for simulations that result in better block coalescing as compared to other simulations may be used to create storage preparation models 230.

In another example, the model creation service 208 may be configured to use machine learning to identify data processing specifications that are likely to result in block coalescing. For example, a machine learning model may be constructed using sample data that has a particular data type, data format, file type, or other defining characteristic, and features associated with data processing specifications. For example, features of data processing specification for dividing the sample data into data blocks may include delimiters, duplicated sections, page breaks, frame boundaries, tags or offsets that may be used to identify data boundaries in the sample data. Features of data processing specifications for compressing the sample data may include compression techniques (e.g., Lempel-Ziv, DEFLATE, JPEG, MP3, MPEG-4, etc.) that correspond with a data type of the sample data. Data processing specifications identified by a machine learning model as having the greatest likelihood of block coalescing may be selected and used to create a storage preparation model 230.

In one example, a machine learning model may be constructed, or a data processing simulation may be executed using public sample data 234. The public sample data 234 may comprise a large public data set that when used to simulate processing of data 242, or used to construct a machine learning model, may result in identifying data processing specifications that when used to process the public sample data 234 for storage to the CAS 238, provide the greatest likelihood of block coalescing. The resulting specifications may be included in a storage preparation model 230 used to process public data (e.g., data 242 that is not specific to any one customer) prior to storing the public data to the CAS 238.

In another example, a machine learning model may be constructed, or a data processing simulation may be executed using customer sample data 236. Data processing specifications that may be identified using the customer sample data 236 may be specific to a customer's data 242 and may be included in a storage preparation model 230 used to prepare the customer's data for storage to the CAS 238. The storage preparation model 230 may be associated with a customer account 232, such that when data 242 associated with the customer account 232 is received at the storage preparation service 204, the storage preparation model 230 may be identified by the customer account 232.

The model creation service 208, in another example, may be configured to enable a user (e.g., a customer or administrator) to construct a storage preparation model 230 by selecting data processing specifications for dividing data 242 into data blocks and optionally compressing selected data blocks prior to storing the data blocks to the CAS 238. Illustratively, a user may be provided with a user interface that allows the user to create a storage preparation model 230 for use in processing the user's data or public data stored to the CAS 238. Storage preparation models 230 created by a user, machine learning, or simulation may be stored to a data store 210, where the storage preparation models 230 may be accessible to the storage preparation service 204.

In yet another example, the model creation service 208 may be configured to create a storage preparation model 230 in the event that an existing storage preparation model 230 does not exist for data 242 having certain defining characteristics. In such an event, a storage preparation model 230 may be constructed using specifications obtained from storage preparation models 230 having similar defining characteristics of the data.

The storage preparation service 204 may be configured to process data 242 for storage to the CAS 238 using storage preparation models 230. The storage preparation service 204 may include a data analysis and model identification module 212, a data splitter module 214, a data compression module 216, and a metadata generation module 218.

The data analysis and model identification module 212 may be configured to analyze data 242 that is to be stored to the CAS 238 and identify defining characteristics for the data 242 used to identify a storage preparation model 230 associated with the data 242. For example, data 242 received at the storage preparation service 204 may be analyzed to identify defining characteristics for the data 242, such as a data type, data format, file version, file name, file owner, or any other characteristic that may be used to associate the data 242 with a storage preparation model 230. Using one or more of the defining characteristics, the data store 210 may be queried for a storage preparation model 230 that may be associated with the defining characteristics.

After identifying a storage preparation model 230 for data 242 that is to be stored to the CAS, the data 242 may be processed using the data splitter module 214 and the data compression module 216. The data splitter module 214 may be configured to divide the data 242 according to the specifications included in the storage preparation model 230. For example, the data 242 may be parsed to identify boundaries between data regions in the data 242 (e.g., file headers or footers, encoding instructions, delimiters, duplicated sections, page breaks, frame boundaries, tags, offsets, etc.) specified in the storage preparation model 230. The data 242 may be divided at each point where a data boundary may be identified, potentially resulting in multiple data blocks.

In the case that a storage preparation model 230 includes specifications for compressing some or all data blocks, the data blocks may be compressed using a compression technique specified by the storage preparation model 230. The data compression module 216 may be configured to identify data blocks that are to be compressed (e.g., data blocks having a data type or characteristic specified in the storage preparation model 230) and compress the data blocks using a specified compression technique.

The metadata generation module 218 may be configured to generate metadata that describes how to retrieve data blocks from the CAS 238 and reassemble the data 242 using the data blocks. For example, the metadata may identify data blocks associated with data 242 stored in the CAS 238, and provide information that may be used to decompress the data blocks and reassemble the data 242 using the data blocks. For example, the metadata may include hash values for the data blocks used to retrieve the data blocks from the CAS 238, and may describe a compression technique used to compress selected data blocks, and may describe an order in which to reassemble data 242 using the data blocks.

In generating the metadata, a DAG that represents the data 242 stored in the CAS 238 may be created and may be included in the metadata. The content of individual data blocks may be used to generate a hash value for the individual data blocks using a hash function. The hash values for the data blocks may be included in the DAG, and the hash values may be used to identify and retrieve the data blocks from the CAS 238. The metadata, in one example, may be included in a root data block that may be stored in the CAS 238 with related data blocks. In another example, the metadata may be included in individual data blocks, such that the metadata in a first data block may point to a second data block. In storing the data blocks to the CAS 238, a hash value for the root data block may be returned to a system or customer that requested the storage of the data 242.

The retrieval and reassembly service 206 may be configured to retrieve data blocks from the CAS 238 and reassemble data 242 using the data blocks in response to a request for the data 242. In one example, the retrieval and reassembly service 206 may include a data retrieval module 220, a data decompression module 222, and a data reassembly module 224. The data retrieval module 220 may be configured to retrieve data blocks from the CAS 238. For example, a hash value that references a root data block stored in the CAS 238 may be provided to the data retrieval module 220 by a customer or service and the hash value may be submitted to the CAS 238, which may retrieve the root data block associated with the hash value and return the root data block to the retrieval and reassembly service 206.

In one example, metadata included in the root data block may include a list of hash values that reference remaining data blocks stored in the CAS 238 that comprise the data 242. In another example, the metadata may include a hash value that points to a next data block stored in the CAS 238 (e.g., describes a graph edge of a DAG). The retrieval and reassembly service 206 may be configured to retrieve the remaining data blocks from the CAS 238 by submitting the hash values to the CAS 238, wherein the CAS 238 then returns the data blocks to the retrieval and reassembly service 206.

The data decompression module 222 may be configured to decompress data blocks that were compressed when stored to the CAS 238. Metadata retrieved from a root data block, or metadata retrieved from individual data blocks, may identify data blocks that have been compressed and may identify a compression technique that may be used to decompress the data blocks. The metadata may be provided to the data decompression module 222, which may be configured to identify the compressed data blocks and decompress the data blocks using a decompression technique identified in the metadata.

The data reassembly module 224 may be configured to reassemble data 242 using the data blocks retrieved from the CAS 238. The data 242 may be reassembled using the data blocks according to a structure or order described in the metadata. In one example, the metadata may be provided to the data reassembly module 224, which may be configured to identify individual data blocks retrieved from the CAS 238 and reassemble the data 242 according to instructions included in the metadata. As an illustration, a data block containing a file header, a data block containing a file body, and a data block containing a file footer may be identified and a file may be reassembled using the data blocks according to an order described in the metadata. Having reassembled data 242, the retrieval and reassembly service 206 may be configured to return the data 242 to a system or customer that requested the data 242.

The various processes and/or other functionality contained within the system 200 may be executed on one or more processors 226 that are in communication with one or more memory modules 228. The system 200 may include a number of computing devices that are arranged, for example, in one or more server banks or computer banks or other arrangements. The computing devices may support a computing environment using hypervisors, virtual machine monitors (VMMs) and other virtualization software. A data store may contain storage preparation models 230, customer accounts 232, as well as other data. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store 210 may include storage systems such as a SAN (Storage Area Network), cloud storage network, volatile or non-volatile RAM, optical media, or hard-drive type media. The data store 210 may be representative of a plurality of data stores as can be appreciated.

The network 240 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
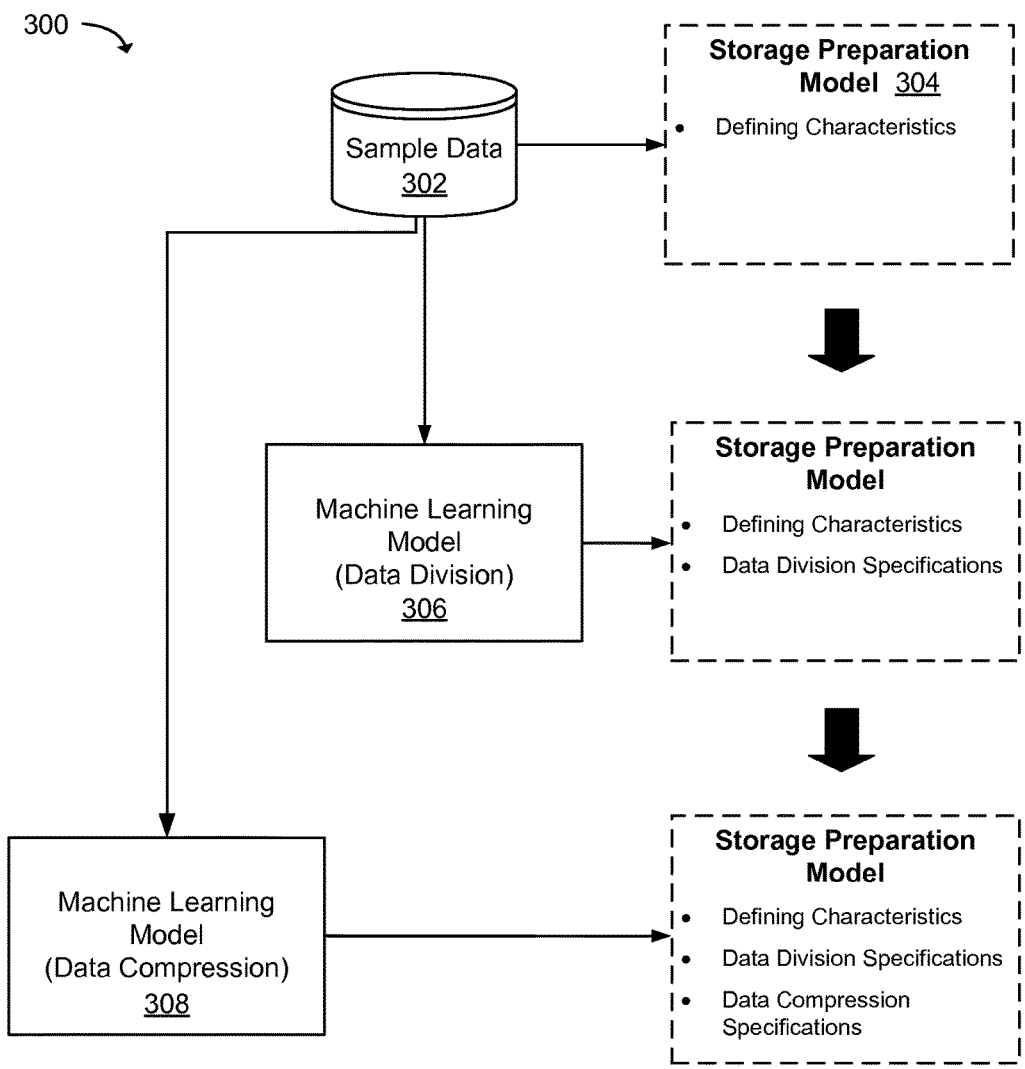
FIG. 3 is a diagram that illustrates an example method for constructing a storage preparation model using machine learning.

Moving now to FIG. 3, a diagram illustrates an example method 300 for constructing a storage preparation model 304 using machine learning. More specifically, machine learning may be used to identify data processing specifications that may be included in the storage preparation model 304. Types of machine learning used to identify data processing specifications may include supervised learning, unsupervised learning, and reinforcement learning. As illustrated, a first machine learning model 306 may be constructed to identify specifications for dividing data into multiple data blocks, and a second machine learning model may be constructed to identify data compression specifications. Any type of machine learning model may be used, including decision tree models, naive Bayes models, genetic algorithm models, as well as other types of models.

The storage preparation model 304 may be constructed for data that has particular defining characteristics. In constructing the storage preparation model 304, sample data 302 representing data for which the storage preparation model 304 is built may be analyzed to identify defining characteristics for the sample data. The defining characteristics may be linked to the storage preparation model 304, such that the storage preparation model 304 may be identified by the defining characteristics.

The sample data 302 may be input to the machine learning model 306 configured to identify data processing specifications for dividing data into multiple data blocks, such that a likelihood of block coalescing may be increased. For example, division of the sample data using various boundaries between data regions (e.g., delimiters, page breaks, frame boundaries, tags, offsets, etc.) may be analyzed to determine which boundary between data regions results in an increase in block coalescing in a CAS. Data processing specifications identified using the machine learning model 306 may be included in the storage preparation model 304.

The sample data 302 may also be input to the machine learning model 308 configured to identify data compression specifications used to compress data blocks prior to storing the data blocks in a CAS. Various data compression techniques may be analyzed to determine a data compression technique's ability to compress the sample data 302. Data compression techniques identified using the machine learning model 308 may be included in the storage preparation model 304. Illustratively, a genetic algorithm (e.g., an adaptive heuristic search algorithm) may be used to determine a data compression technique that may be included in the storage preparation model 304.

In some cases, sample data 302 (e.g., a data file) may include multiple data types. For example, an image file may include an image header and an image body. The image header may be one data type (e.g., text data) and the image body may be another data type (image data). As a result, a first compression technique may be more effective for compressing the image header and a second compression technique may be more affective for compressing the image body. As such, data compression specifications included in the storage preparation model 304 may include the first compression technique used to compress image headers and the second compression technique used to compress image bodies.

Figure 4:
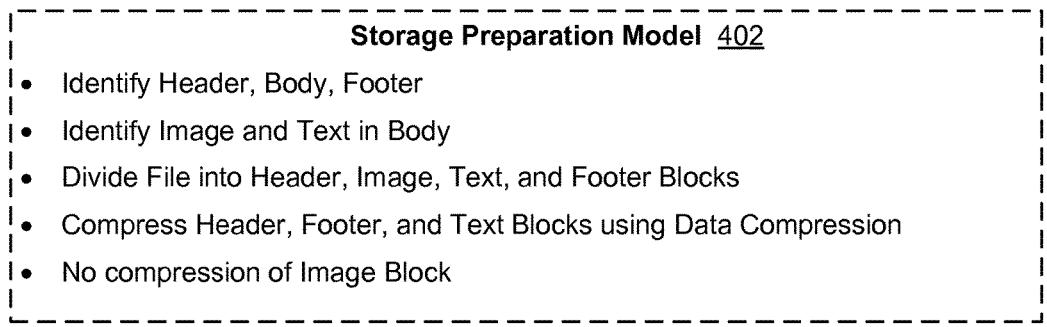
FIG. 4 is a diagram illustrating an example method for preparing a file for storage to a CAS using a storage preparation model.
Figure 4:
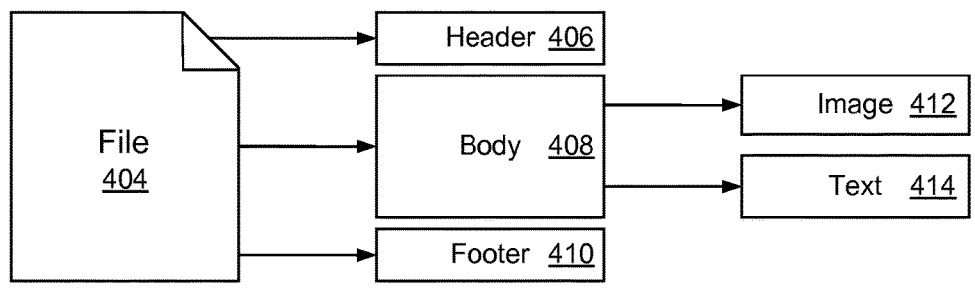
Figure 4:
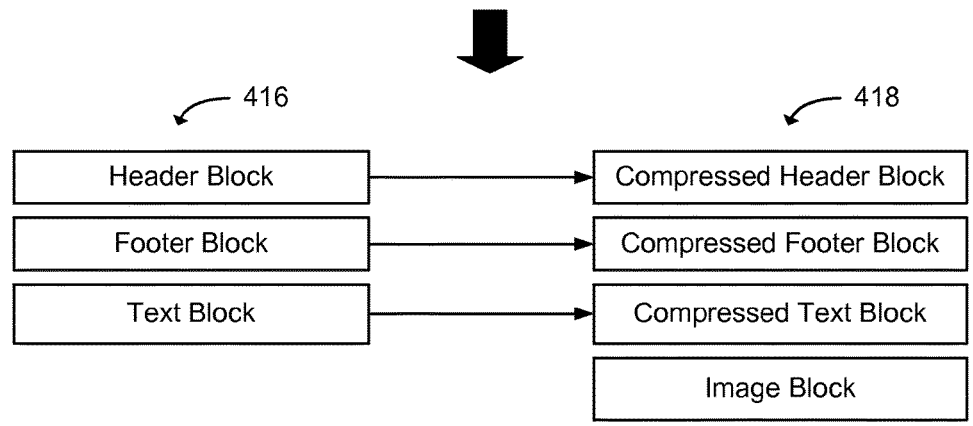

FIG. 4 is a diagram illustrating a specific example for preparing a file 404 for storage to a CAS using a storage preparation model 402. As illustrated, a file 404 may be divided into multiple file blocks according to specifications included in the storage preparation model 402. For example, the storage preparation model 402 may specify that a file header 406, body 408, and footer 410 may be identified. Illustratively, the file 404 may be parsed to identify section tags included in the file 404, such as a header section tag, a body section tag, and a footer section tag 410. The file 404 may then be divided at a point where the section tags are located.

Also, the storage preparation model 402 may specify that the file body 408 be analyzed to identify any images 412 that may be included in the file body 408, such that the images 412 may be separated from the text 414 of the body 408. After identifying the header 406, image 412, text 414, and footer 410, the storage preparation model 402 may specify that the file 404 be divided into file blocks 416, namely, a header block, footer block, image block, and text block.

The storage preparation model 402 may include specifications for compressing select file blocks 416 using a compression technique. For example, compression specifications may indicate that the header block, footer block, and text block be compressed using a specified data compression technique, and that the image block not be compressed. For example, the image block may already be compressed (e.g., JPEG compression) and may not need to be compressed further. In processing the file 404 for storage to the CAS, metadata 420 may be generated describing which file blocks 416 have been compressed with which compression technique and describes how to reassemble the file 404. For example, the metadata may identify the file blocks 418 using a hash value for the individual file blocks 418, and may indicate which file blocks 418 have been compressed using a data compression technique and which file blocks 418 have not been compressed.

Figure 5:
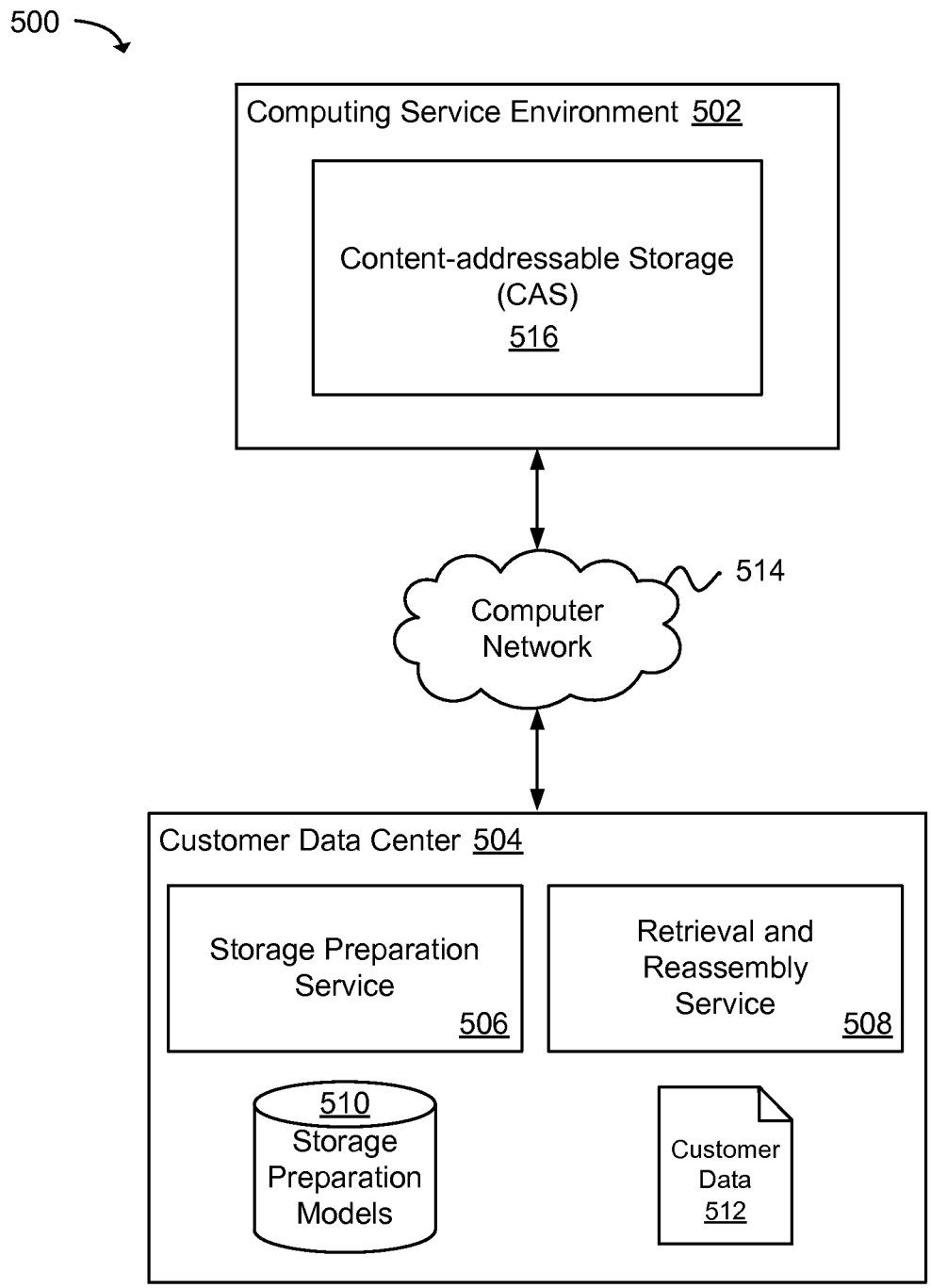
FIG. 5 is a block diagram that illustrates an example method for preparing customer data at a customer data center for storage in a CAS that may be hosted in a computing service environment.

FIG. 5 is a block diagram illustrating an example system 500 for preparing customer data 512 at a customer data center 504 for storage in a CAS 516 hosted in a computing service environment 502. In one example, the computing service environment 502 may be operated by a computing service provider that offers computing services to end customers.

As illustrated, the customer data center 504 may host a storage preparation service 506 and a retrieval and reassembly service 508. The storage preparation service 506 may be configured to process customer data 512 that is to be stored to the CAS 516 using one or more storage preparation models 510. More specifically, customer data 512 having certain defining characteristics may be divided into data blocks and selective data blocks may be compressed according to specifications of a storage preparation model 510 that may be linked to the defining characteristics of the customer data 512. In one example, a customer may create storage preparation models 510 that are specific to the customer's data. In another example, storage preparation models 510 may be provided by a computing service operator and stored in the customer data center 504, or retrieved from the computing service environment 502.

After dividing the customer data 512 into data blocks according to the specifications of the storage preparation model 510, all or selected data blocks may be compressed using one or more compression techniques specified by the storage preparation model 510. A hash value for a root block containing metadata describing how to retrieve the customer data 512 may be generated and the hash value may be stored in the customer data center 504, thereby enabling retrieval of the customer data 512 from the CAS 516.

The customer data 512 (i.e., data blocks) may be transmitted over a computer network 514 to the CAS 516 located in the computing service environment 502. In the event that the customer data 512 is to be retrieved from the CAS 516, the retrieval and reassembly service 508 may be configured to submit the hash value for a root data block to the CAS 516, whereupon the root data block may be returned to the retrieval and reassembly service 508. Metadata included in the root data block may then be used to identify and retrieve the remaining data blocks from the CAS 516 and to reassemble the customer data 512 using the data blocks.

Figure 6:
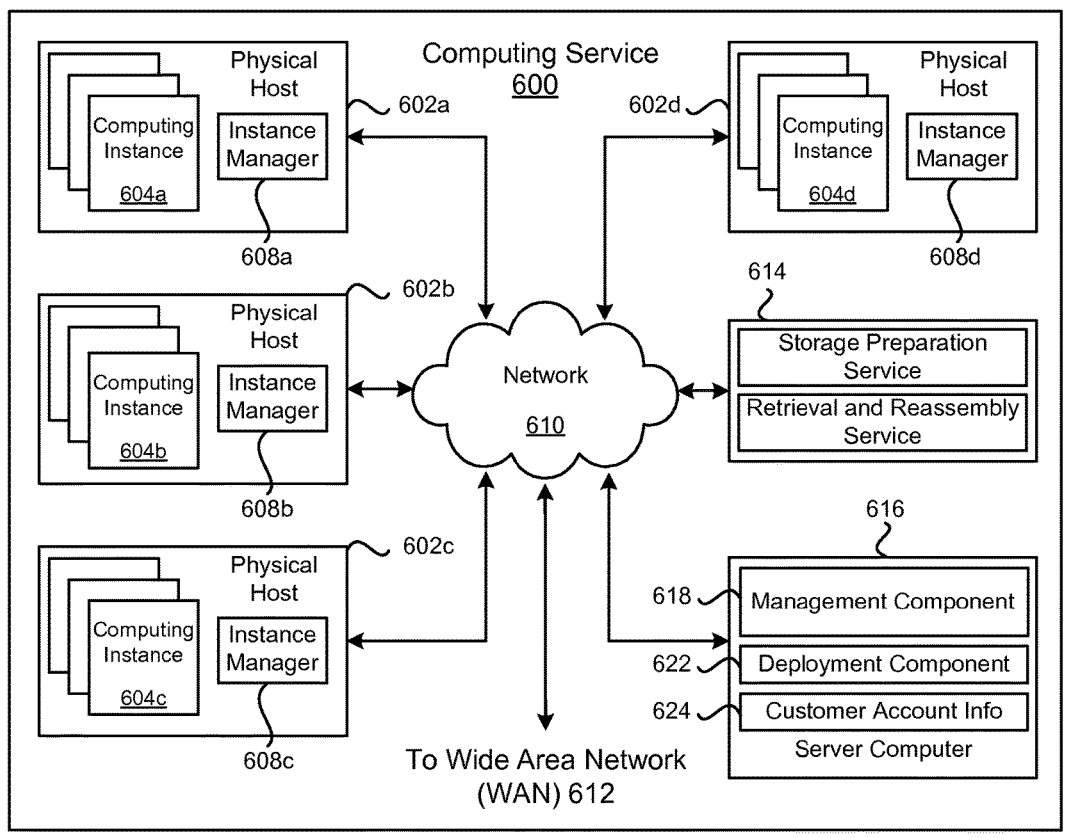
FIG. 6 is a block diagram that illustrates an example computing service environment that includes a storage preparation service, and a retrieval and reassembly service.

FIG. 6 is a block diagram illustrating an example computing service 600 that may be used to execute and manage a number of computing instances 604a-d. In particular, the computing service 600 depicted illustrates one environment in which the technology described herein may be used. The computing service 600 may be one type of environment that includes various virtualized service resources that may be used, for instance, to host computing instances 604a-d.

The computing service 600 may be capable of delivery of computing, storage and networking capacity as a software service to a community of end recipients. In one example, the computing service 600 may be established for an organization by or on behalf of the organization. That is, the computing service 600 may offer a "private cloud environment." In another example, the computing service 600 may support a multi-tenant environment, wherein a plurality of customers may operate independently (i.e., a public cloud environment). Generally speaking, the computing service 600 may provide the following models: Infrastructure as a Service ("IaaS"), Platform as a Service ("PaaS"), and/or Software as a Service ("SaaS"). Other models may be provided. For the IaaS model, the computing service 600 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 600. End customers may access the computing service 600 using networked client devices, such as desktop computers, laptops, tablets, smartphones, etc. running web browsers or other lightweight client applications, for example. Those familiar with the art will recognize that the computing service 600 may be described as a "cloud" environment.

The particularly illustrated computing service 600 may include a plurality of server computers 602a-d. While four server computers are shown, any number may be used, and large data centers may include thousands of server computers. The computing service 600 may provide computing resources for executing computing instances 604a-d. Computing instances 604a-d may, for example, be virtual machines. A virtual machine may be an instance of a software implementation of a machine (i.e. a computer) that executes applications like a physical machine. In the example of a virtual machine, each of the server computers 602*a-d* may be configured to execute an instance manager 608*a-d* capable of executing the instances. The instance manager 608*a-d* may be a hypervisor, virtual machine monitor (VMM), or another type of program configured to enable the execution of multiple computing instances 604*a-d* on a single server. Additionally, each of the computing instances 604*a-d* may be configured to execute one or more applications.

One or more server computers 614 and 616 may be reserved to execute software components for managing the operation of the computing service 600 and the computing instances 604*a-d*. For example, a server computer 614 may execute a storage preparation service configured to prepare data for storage to a CAS, and a retrieval and reassembly service configured to retrieve data blocks from the CAS and reassemble data using the data blocks.

A server computer 616 may execute a management component 618. A customer may access the management component 618 to configure various aspects of the operation of the computing instances 604*a-d* purchased by a customer. For example, the customer may setup computing instances 604*a-d* and make changes to the configuration of the computing instances 604*a-d*.

A deployment component 622 may be used to assist customers in the deployment of computing instances 604*a-d*. The deployment component 622 may have access to account information associated with the computing instances 604*a-d*, such as the name of an owner of the account, credit card information, country of the owner, etc. The deployment component 622 may receive a configuration from a customer that includes data describing how computing instances 604*a-d* may be configured. For example, the configuration may include an operating system, provide one or more applications to be installed in computing instances 604*a-d*, provide scripts and/or other types of code to be executed for configuring computing instances 604*a-d*, provide cache logic specifying how an application cache should be prepared, and other types of information. The deployment component 622 may utilize the customer-provided configuration and cache logic to configure, prime, and launch computing instances 604*a-d*. The configuration, cache logic, and other information may be specified by a customer accessing the management component 618 or by providing this information directly to the deployment component 622.

Customer account information 624 may include any desired information associated with a customer of the multi-tenant environment. For example, the customer account information may include a unique identifier for a customer, a customer address, billing information, licensing information, customization parameters for launching instances, scheduling information, etc. As described above, the customer account information 624 may also include security information used in encryption of asynchronous responses to API requests. By "asynchronous" it is meant that the API response may be made at any time after the initial request and with a different network connection.

A network 610 may be utilized to interconnect the computing service 600 and the server computers 602*a-d*, 616. The network 610 may be a local area network (LAN) and may be connected to a Wide Area Network (WAN) 612 or the Internet, so that end customers may access the computing service 600. The network topology illustrated in FIG. 6 has been simplified, many more networks and networking devices may be utilized to interconnect the various computing systems disclosed herein.

Figure 7:
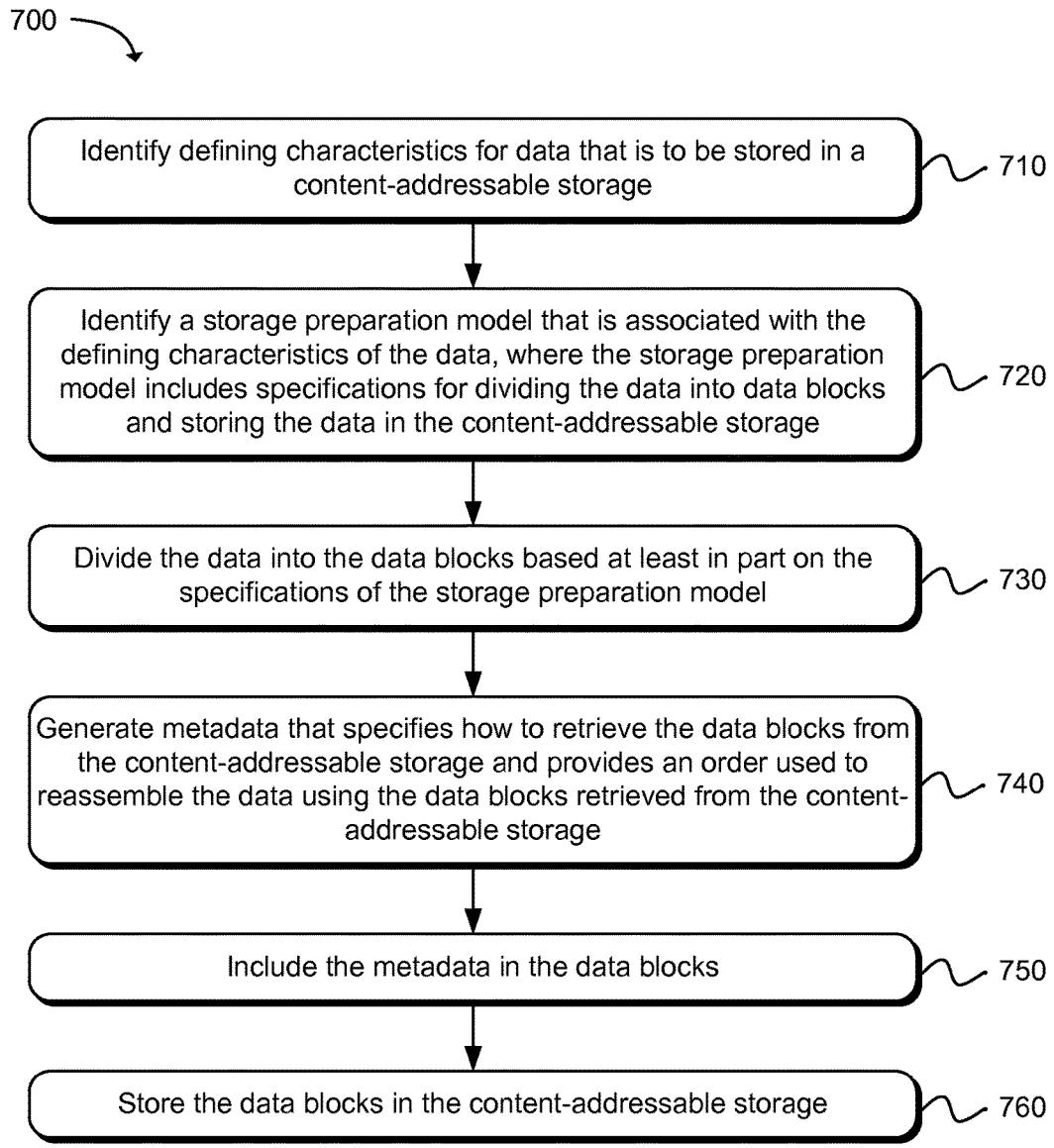
FIG. 7 is a flow diagram that illustrates an example method for preparing data for storage to a CAS.

FIG. 7 is a flow diagram that illustrates an example method 700 for preparing data for storage to a content-addressable storage. Starting in block 710, defining characteristics for data that is to be stored in a content-addressable storage may be identified. For example, the data (e.g., an electronic file) may be received via a computer network at a storage preparation service and the data may be analyzed to identify defining characteristics for the data.

As in block 720, a storage preparation model that may be associated with the defining characteristics of the data may be identified, where the storage preparation model includes specifications for dividing the data into data blocks and storing the data in the content-addressable storage. In one example, the storage preparation model may include specifications for a delimiter and the data may be analyzed to identify the delimiter in the data. The delimiter may specify a boundary between data regions in the data and at least one point in the data where the data may be divided into data blocks.

In another example, the storage preparation model may identify one or more duplicated data regions that may be included in files having certain defining characteristics. The data may be analyzed to identify the duplicated data regions that may be included data. The duplicated data regions may mark at least one point in the data where the data may be divided into data blocks. Other techniques that may be used to identify data boundaries in data and divide the data into data blocks, resulting in a greater probability that at least some of the data blocks are identical to data blocks already stored in the content-addressable storage are within the scope of this disclosure.

As in block 730, the data may be divided into data blocks based at least in part on the specifications of the storage preparation model. In one example, at least one data block included in the data blocks may be compressed using a data compression technique specified by the storage preparation model, and metadata may be generated that identifies the at least one data block that is compressed and the data compression technique used to compress the data block.

As in block 740, metadata may be generated that specifies how to retrieve the data blocks from the content-addressable storage and provides an order used to reassemble the data using the data blocks retrieved from the content-addressable storage. In one example, a directed acyclic graph may be generated that represents the data stored in the content-addressable storage and the DAG may be included in the metadata. As in block 750, the metadata may be included in the data blocks. For example, the metadata may be included in a root data block and/or within individual data blocks stored to the content-addressable storage.

Having prepared the data for storage to the content-addressable storage, as in block 760, the data blocks may be stored in the content-addressable storage. A hash value for a root file block included in the data blocks stored to the content-addressable storage may be returned (e.g., to a system or customer), where the root file block may contain information used to retrieve the data blocks from the content-addressable storage.

Figure 8:
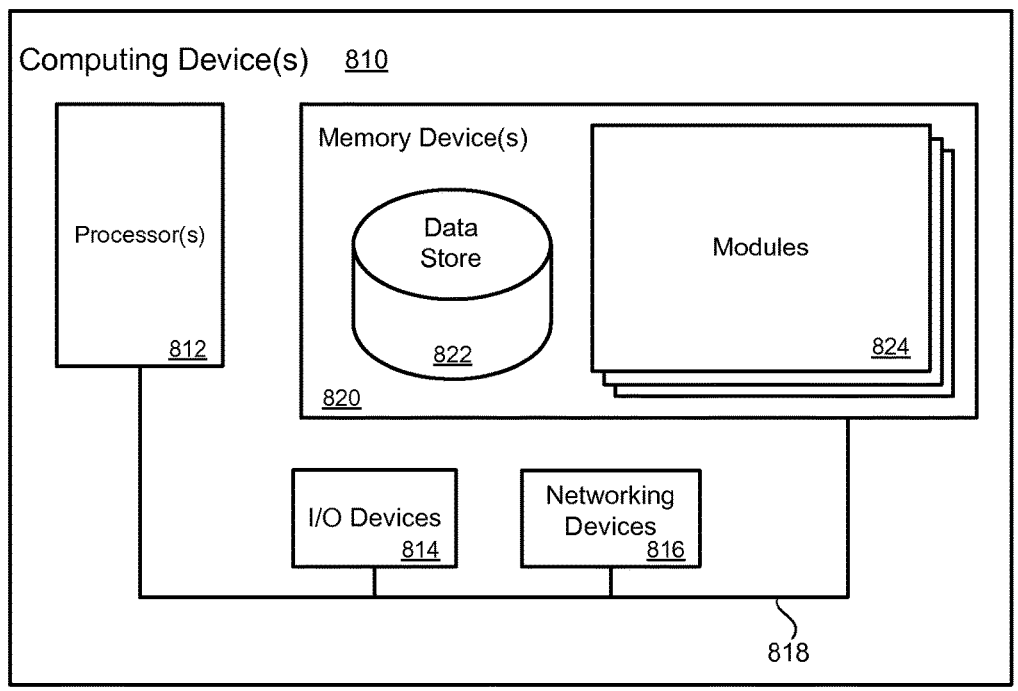
FIG. 8 is block diagram illustrating an example of a computing device that may be used to execute a method for preparing and storing data to a CAS using a storage preparation model.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. Modules that may be contained in the memory device 820 include a data analysis and model identification module, a data splitter module, a data compression module, a metadata generation module, a data retrieval module, a data decompression module, a data reassembly module, and other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
   receive an electronic file, via a computer network, that is to be stored in a content-addressable storage located within a computing service environment;
   analyze the electronic file to identify defining characteristics for the electronic file;
   identify a storage preparation model associated with the electronic file using the defining characteristics for the electronic file, wherein the storage preparation model includes specifications for dividing the electronic file having the defining characteristics into a plurality of file blocks and compressing the plurality of file blocks using a data compression technique prior to storing the plurality of file blocks in the content-addressable storage, resulting in coalescing the plurality of file blocks in the content-addressable storage;
   divide the electronic file into a first plurality of file blocks according to the specifications of the storage preparation model;
   compress selected file blocks included in the first plurality of file blocks according to the specifications of the storage preparation model to create a second plurality of file blocks;
   create metadata describing retrieval of the second plurality of file blocks from the content-addressable storage, the metadata further describing decompression and reassembly of the second plurality of file blocks into the electronic file based on retrieval of the second plurality of file blocks from the content-addressable storage;
   create a root file block from at least one file block in the second plurality of file blocks and a hash value of the at least one file block, the root file block comprising the metadata and references to storage of the second plurality of file blocks in the content-addressable storage; and
   store the second plurality of file blocks, including the root file block, in the content-addressable storage; and
   retrieve the root file block from the content-addressable storage using the hash value associated with the root file block.

2. The non-transitory machine readable storage medium as in claim 1, wherein the instructions that when executed by the processor further return the hash value for the root file block included in the second plurality of file blocks stored in the content-addressable storage, the root file block containing information used to retrieve the second plurality of file blocks from the content-addressable storage.

3. The non-transitory machine readable storage medium as in claim 1, wherein the instructions that when executed by the processor further:
   retrieve the references in the root file block to the storage of the second plurality of file blocks in the content-addressable storage comprising file block hash values that identify the storage of the second plurality of file blocks in the content-addressable storage;
   retrieve the second plurality of file blocks from the content-addressable storage using the file block hash values;
   decompress the second plurality of file blocks according to one or more decompression operations associated with the metadata into the first plurality of files blocks; and
   reassemble the electronic file from the first plurality of file blocks according to one or more reassembly operations associated with the metadata.

4. A computer implemented method, comprising:
   identifying defining characteristics for data that is to be stored in a content-addressable storage, using a processor;
   identifying a storage preparation model that is associated with the defining characteristics of the data, using the processor, wherein the storage preparation model includes specifications for dividing the data into data blocks and storing the data in the content-addressable storage using the data blocks;
   dividing the data into the data blocks based at least in part on the specifications of the storage preparation model, using the processor;
   generating metadata for a first one of the file blocks that specifies a content address indicating how to retrieve a second one of the data blocks from the content-addressable storage and provides an order used to reassemble the data using the data blocks when retrieved from the content-addressable storage, using the processor;
   including the metadata in the first one of the data blocks when stored in the content addressable storage, using the processor; and
   accessing the data blocks in the content-addressable storage based at least in part on accessing the second one of the data blocks using the content address in the metadata included in the first one of the data blocks, using the processor.

5. The method as in claim 4, further comprising:
   compressing at least one data block included in the data blocks having a data format identified by the storage preparation model using a data compression technique specified by the storage preparation model; and
   generating metadata specifying that the at least one data block is compressed using the data compression technique.

6. The method as in claim 4, further comprising analyzing the data to identify a delimiter in the data specifying a boundary between data regions in the data and at least one point in the data where the data is to be divided into the data blocks, wherein the delimiter is included in the specifications of the storage preparation model.

7. The method as in claim 4, further comprising analyzing the data to identify duplicated data regions in a file type, marking at least one point in the data where the data is to be divided into the data blocks, and the duplicated data regions are included in the specification of the storage preparation model.

8. The method as in claim 4, further comprising creating the storage preparation model using machine learning and a public data set having the defining characteristics, wherein the public data set is input to a machine learning model that outputs the storage preparation model having the specifications for dividing the data into the data blocks.

9. The method as in claim 4, further comprising creating the storage preparation model using machine learning and a customer data set having the defining characteristics, wherein the customer data set is input to a machine learning model that outputs the storage preparation model having the specifications for dividing the data into the data blocks.

10. The method as in claim 4, further comprising:
identifying a compression technique used to compress the data blocks prior to storing the data blocks in the content-addressable storage using a machine learning model; and
including the compression technique in the specifications of the storage preparation model.

11. The method as in claim 4, wherein identifying the storage preparation model associated with the data further comprises:
identifying a customer account associated with the data; and
identifying the storage preparation model that is associated with the customer account and the data, wherein the specifications included in the storage preparation model are provided by a customer having the customer account.

12. The method as in claim 4, further comprising creating the storage preparation model to include the defining characteristics that are used to associate the storage preparation model with the data, including: a delimiter specifying a boundary between data regions where the data is to be divided into the data blocks, and a compression technique used to compress data blocks having a data format.

13. The method as in claim 4, wherein identifying the storage preparation model associated with the data further comprises:
determining that an existing storage preparation model does not exist for the data having the defining characteristics; and
creating the storage preparation model that includes the specifications for dividing the data into data blocks and storing the data in the content-addressable storage.

14. The method as in claim 4, further comprising generating a Directed Acyclic Graph (DAG) that represents the data stored in the content-addressable storage where the DAG is included in the metadata and describes graph edges for the DAG.

15. The method as in claim 14, further comprising returning a hash value that identifies a root file block of the DAG stored to the content-addressable storage to an owner of the data, wherein the owner uses the hash value for the root file block to retrieve the data from the content-addressable storage.

16. The method as in claim 4, wherein storing the data blocks in the content-addressable storage further comprises storing the data blocks in a key-value object storage service used as part of the content-addressable storage that executes within a computing service environment.

17. A system comprising:
a processor;
a content-addressable storage; and
a memory device including instructions that, when executed by the processor, cause the system to:
construct a storage preparation model having information to divide data having defining characteristics into data blocks and to select a compression technique for at least one of the data blocks prior to storing the data blocks in the content-addressable storage;
analyze the data that is to be stored in the content-addressable storage to identify defining characteristics associated with the data;
identify the storage preparation model associated with the data using the defining characteristics;
divide the data into the data blocks according to specifications of the storage preparation model;
compress at least one of the data blocks using the compression technique specified in the storage preparation model;
create metadata for at least a first one of the data blocks describing retrieval of a second one of the data blocks from the content-addressable storage using a content address, the metadata further describing decompression and reassembly of the data using the data blocks when retrieved from the content-addressable storage;
provide the data blocks and the metadata to the content-addressable storage;
wherein the first one of the data blocks provided to the content-addressable storage includes the metadata describing retrieval of the second one of the data blocks from the content-addressable storage using the content address; and
access the data blocks in the content-addressable storage based at least in part on accessing the second one of the data blocks using the content address in the metadata included in the first one of the data blocks.

18. The system as in claim 17, wherein the data is divided into the data blocks for storage to the content-addressable storage at a customer data center and the data blocks are transmitted over a computer network to the content-addressable storage located in a computing service environment associated with a computing service provider.

19. The system as in claim 17, wherein the memory device includes instructions that, when executed by the processor, causes the system to further identify a customer account associated with the data, wherein the customer account is used in identifying the storage preparation model.

20. The system as in claim 17, wherein the memory device includes instructions that, when executed by the processor, causes the system to receive instructions from a customer specifying that the data is to be divided and compressed according to the storage preparation model prior to storing the data in the content-addressable storage.

* * * * *